(12) United States Patent
Heieie

(10) Patent No.: US 8,851,796 B2
(45) Date of Patent: Oct. 7, 2014

(54) PIPE RETRIEVER

(75) Inventor: John M. Heieie, Casa Grande, AZ (US)

(73) Assignee: Southeast Directional Drilling, LLC, Casa Grande, AZ (US)

( * ) Notice: Subject to any disclaimer, the term of this patent is extended or adjusted under 35 U.S.C. 154(b) by 0 days.

(21) Appl. No.: 13/595,279

(22) Filed: Aug. 27, 2012

(65) Prior Publication Data
US 2014/0056647 A1 Feb. 27, 2014

(51) Int. Cl.
*E21B 31/18* (2006.01)
*E21B 7/28* (2006.01)
*F16L 55/18* (2006.01)
*F16L 55/26* (2006.01)
*H02G 1/08* (2006.01)
*F16L 1/028* (2006.01)

(52) U.S. Cl.
USPC ............ 405/184.1; 405/184; 405/154.1; 294/86.1

(58) Field of Classification Search
USPC ............ 405/154.1, 184.1; 166/98, 301; 294/86.1, 90, 91
See application file for complete search history.

(56) References Cited

U.S. PATENT DOCUMENTS

| | | | | |
|---|---|---|---|---|
| 87,097 A * | 2/1869 | Fisher | | 294/90 |
| 94,484 A * | 9/1869 | Fleming | | 294/91 |
| 98,459 A * | 12/1869 | Good | | 294/90 |
| 109,462 A * | 11/1870 | Smith | | 294/91 |
| 109,463 A * | 11/1870 | Smith | | 294/91 |
| 109,464 A * | 11/1870 | Smith | | 294/91 |
| 199,533 A * | 1/1878 | Gillespie | | 294/90 |
| 236,617 A * | 1/1881 | Paul | | 7/127 |
| 241,415 A * | 5/1881 | Phillis | | 403/164 |
| 270,158 A * | 1/1883 | Patten | | 294/106 |
| 368,104 A * | 8/1887 | Moser | | 294/90 |
| 448,458 A * | 3/1891 | Saunders | | 248/78 |
| 504,599 A * | 9/1893 | Lockwood | | 173/83 |
| 681,937 A * | 9/1901 | Spink | | 294/91 |
| 774,900 A * | 11/1904 | Wilson | | 294/86.1 |
| 776,221 A * | 11/1904 | Day | | 294/86.1 |
| 849,623 A * | 4/1907 | Killian | | 294/91 |
| 908,061 A * | 12/1908 | Andrews | | 294/102.2 |
| 989,499 A * | 4/1911 | Gibson | | 294/90 |
| 1,070,124 A * | 8/1913 | Fair | | 294/90 |
| 1,086,257 A * | 2/1914 | Wilkinson | | 81/90.6 |
| 1,276,297 A * | 8/1918 | White | | 294/90 |
| 1,285,102 A * | 11/1918 | Foster | | 294/91 |
| 1,295,439 A * | 2/1919 | Coveney | | 294/90 |
| 1,314,996 A * | 9/1919 | Wilson | | 294/90 |
| 1,385,435 A * | 7/1921 | Dunn | | 294/91 |
| 1,420,010 A * | 6/1922 | Wright | | 294/90 |
| 1,433,623 A * | 10/1922 | Johnston | | 294/106 |
| 1,451,700 A * | 4/1923 | Kildow | | 294/91 |
| 1,468,589 A * | 9/1923 | Wilson | | 294/90 |
| 1,495,394 A * | 5/1924 | Bergsten | | 294/91 |
| 1,498,141 A * | 6/1924 | Wilson | | 294/90 |

(Continued)

*Primary Examiner* — John Kreck
*Assistant Examiner* — Edwin Toledo-Duran
(74) *Attorney, Agent, or Firm* — Honigman Miller Schwartz and Cohn LLP

(57) ABSTRACT

A pipe retriever for retrieving an unsecured pipe has a head connectable to a drilling pipe and defines a longitudinal axis. The longitudinal axis of the head is arranged substantially parallel to a longitudinal axis of the drilling pipe when connected. A tail extends from the head at an angle with respect to the longitudinal axis. The tail defines a hook shape having inward and outward surfaces. The inward hook surface defines a pipe recess sized to receive the unsecured pipe.

17 Claims, 9 Drawing Sheets

(56) References Cited

U.S. PATENT DOCUMENTS

| | | | |
|---|---|---|---|
| 1,507,048 A * | 9/1924 | Devlin | 294/91 |
| 1,512,411 A * | 10/1924 | Farrier | 294/86.29 |
| 1,526,174 A * | 2/1925 | Obermuller | 294/86.29 |
| 1,527,413 A * | 2/1925 | Hinderliter | 294/86.1 |
| 1,527,534 A * | 2/1925 | Black | 294/90 |
| 1,538,259 A * | 5/1925 | Ratigan | 294/101 |
| 1,541,986 A * | 6/1925 | Martin | 294/91 |
| 1,543,966 A * | 6/1925 | Williams | 294/90 |
| 1,547,282 A * | 7/1925 | Youker | 294/90 |
| 1,549,199 A * | 8/1925 | Kelso et al. | 294/90 |
| 1,561,387 A * | 11/1925 | White et al. | 294/91 |
| 1,564,977 A * | 12/1925 | Schlinger | 294/91 |
| 1,587,971 A * | 6/1926 | McClease | 294/86.15 |
| 1,599,067 A * | 9/1926 | Segelhorst | 294/86.17 |
| 1,664,461 A * | 4/1928 | Montgomery | 294/102.2 |
| 1,716,885 A * | 6/1929 | Grant | 294/90 |
| 1,738,937 A * | 12/1929 | Baker | 166/55.1 |
| 1,779,895 A * | 10/1930 | White | 294/90 |
| 1,781,922 A * | 11/1930 | Grant | 294/90 |
| 1,782,754 A * | 11/1930 | Wilcox | 294/91 |
| 1,787,853 A * | 1/1931 | Biggs | 294/91 |
| 1,804,758 A * | 5/1931 | Fitzpatrick et al. | 294/90 |
| 1,806,944 A * | 5/1931 | Krell | 294/102.2 |
| 1,871,845 A * | 8/1932 | Grant | 294/90 |
| 1,924,424 A * | 8/1933 | Meter | 294/86.1 |
| 2,043,460 A * | 6/1936 | Young | 294/82.1 |
| 2,065,781 A * | 12/1936 | Wilson | 294/90 |
| 2,081,591 A * | 5/1937 | Lundeen | 294/90 |
| 2,150,581 A * | 3/1939 | De Coursey | 294/90 |
| 2,151,294 A * | 3/1939 | Ellingsen | 384/428 |
| 2,264,775 A * | 12/1941 | Spang | 294/90 |
| 2,644,713 A * | 7/1953 | Failing | 294/86.4 |
| 2,684,166 A * | 7/1954 | De Jarnett | 414/626 |
| 3,330,591 A * | 7/1967 | Pavelka | 294/90 |
| 3,368,699 A * | 2/1968 | Scaggs | 414/22.54 |
| 3,447,829 A * | 6/1969 | Gyongyosi | 294/91 |
| 3,458,230 A * | 7/1969 | Jones et al. | 294/90 |
| 3,561,811 A * | 2/1971 | Turner | 294/90 |
| 3,884,519 A * | 5/1975 | McFadden | 294/90 |
| 3,905,631 A * | 9/1975 | Ricks et al. | 294/65.5 |
| 3,937,514 A * | 2/1976 | Langowski | 294/194 |
| RE29,995 E * | 5/1979 | Guier | 294/90 |
| 4,396,216 A * | 8/1983 | Hamilton | 294/90 |
| 4,725,088 A * | 2/1988 | Mank | 294/90 |
| 4,981,316 A * | 1/1991 | McMahon | 294/90 |
| 6,163,936 A * | 12/2000 | Benoit | 24/130 |
| 6,371,543 B1* | 4/2002 | Fujikawa et al. | 294/82.13 |
| 6,695,539 B2* | 2/2004 | McMillan et al. | 405/191 |
| 6,928,709 B2* | 8/2005 | McMillan et al. | 29/281.1 |
| 7,032,678 B2* | 4/2006 | Mosing et al. | 166/380 |
| 7,866,721 B2* | 1/2011 | Hollin | 294/90 |

\* cited by examiner

PIPE RETRIEVER

TECHNICAL FIELD

This disclosure relates to a pipe retriever for hooking and retrieving unsecured pipes.

BACKGROUND

Directional drilling or boring is generally used for installing infrastructure such as telecommunications and power cable conduits, water lines, sewer lines, gas tines, oil lines, product pipelines, and environmental remediation casings. Directional drilling allows crossing waterways, roadways, shore approaches, congested areas, environmentally sensitive areas, and areas where other methods are costlier or not possible. The technique has extensive use in urban areas for developing subsurface utilities as it helps in avoiding extensive open cut trenches. The use may require that the operator have complete information about existing utilities so that he/she can plan the alignment to avoid damaging those utilities.

In general, a pipeline can be installed with a directional drilling apparatus under a barrier, such as highway, road, waterway, building, or other surface obstruction without disturbing the barrier. Installation of the pipeline under the barrier typically entails drilling a hole under the barrier and then advancing a pipeline section through the hole.

SUMMARY

One aspect of the disclosure provides a pipe retriever for retrieving an unsecured pipe. The pipe retriever includes a head and a tail. The head is connectable to a drilling pipe and defines a longitudinal axis. The longitudinal axis of the head is arranged substantially parallel to a longitudinal axis of the drilling pipe when connected. The tail extends from the head at an angle with respect to the longitudinal axis and defines a hook shape having inward and outward surfaces. The inward hook surface defines a pipe recess sized for receiving the unsecured pipe.

Implementations of the disclosure may include one or more of the following features. In some implementations, the pipe recess is sized to allow sliding of the received unsecured pipe therein and catch a pipe joint of the unsecured pipe. The pipe recess may define a circular shape having a radius larger than an outer radius of the unsecured pipe and less than an outer pipe joint radius of the unsecured pipe.

In some implementations, the tail has proximal and distal portions. The proximal tail portion defines the pipe recess and the distal tail portion defines an arcuate shape. The arcuate shape guides the unsecured pipe to the pipe recess. The distal tail portion may have a radius of curvature larger than a radius of the pipe recess. The pipe recess defines a circular shape in some implementations and other shapes are possible as well, such as polygonal or V-shaped. The proximal and distal tail portions may define corresponding longitudinal axes arranged at an angle with respect to each other of between about 20° and about 90° (e.g., 30°). Moreover, the longitudinal axis of the distal tail portion may intersect proximal and distal ends of the distal tail portion. A gap between a distal end of the tail and the head may be greater than a diameter of the unsecured pipe. In some implementations, the tail extends from the head at an angle with respect to the longitudinal axis of between about 45° and about 135° (e.g., about 90°).

In some implementations, the pipe recess defines a center axis arranged substantially parallel to the longitudinal axis of the receiver head. The center axis of the pipe recess may be offset from the longitudinal axis of the receiver head by a distance less than or equal to a diameter of the unsecured pipe.

In some implementations, the head includes a cylindrical body and/or has a threaded connector connectable to the drilling pipe. The tail may include first and second plates spaced along the longitudinal direction of the head, for example, to provide a relatively light weight, yet strong hook resistant to deformation from moments about the head.

Another aspect of the disclosure provides a method of retrieving an unsecured pipe. The method includes inserting a pipe retriever into a bore having an unsecured pipe, positioning the pipe retriever adjacent the unsecured pipe, and rotating the pipe retriever about a longitudinal axis defined by a head of the pipe retriever to rotate a hook shaped tail extending from the head to receive the unsecured pipe. The tail receives the unsecured pipe in a pipe recess defined by the tail.

In some implementations, the method includes receiving the unsecured pipe initially along an inward surface of distal tail portion. The distal tail portion defines an arcuate shape that guides the unsecured pipe to the pipe recess defined by a proximal portion of the tail.

In some implementations the method includes catching a joint of the unsecured pipe in the pipe recess. The pipe recess sized to allow sliding movement of the received unsecured pipe and catch the joint of the unsecured pipe. The pipe recess may define a circular shape with a radius larger than an outer radius of the unsecured pipe and less than an outer pipe joint radius of the unsecured pipe.

In some implementations, the method includes holding the received unsecured pipe concomitantly juxtaposed (e.g., adjacent and substantially parallel to) a drill pipe. The drill pipe connected to the head of the pipe retriever. The pipe recess may define a center axis arranged substantially parallel to the longitudinal axis of the head. The center axis of the pipe recess may be offset from the longitudinal axis of the receiver head by a distance less than or equal to a diameter of the unsecured pipe.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
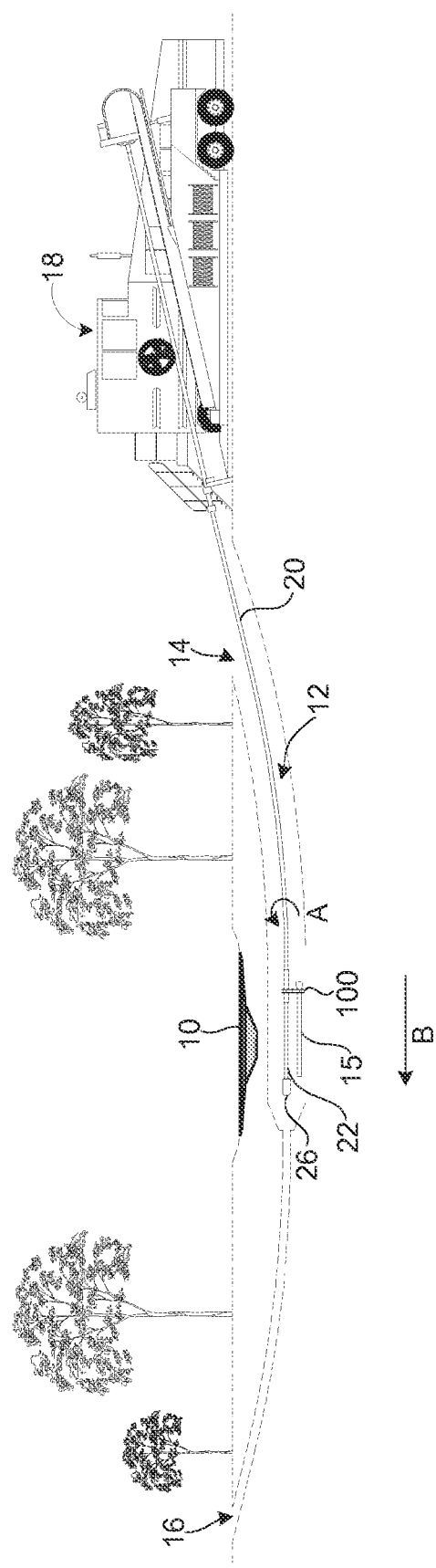
FIG. 1 is a schematic view illustrating drilling a pilot bore for installing a larger diameter section of pipe under a barrier, such as a roadway.
Figure 2:
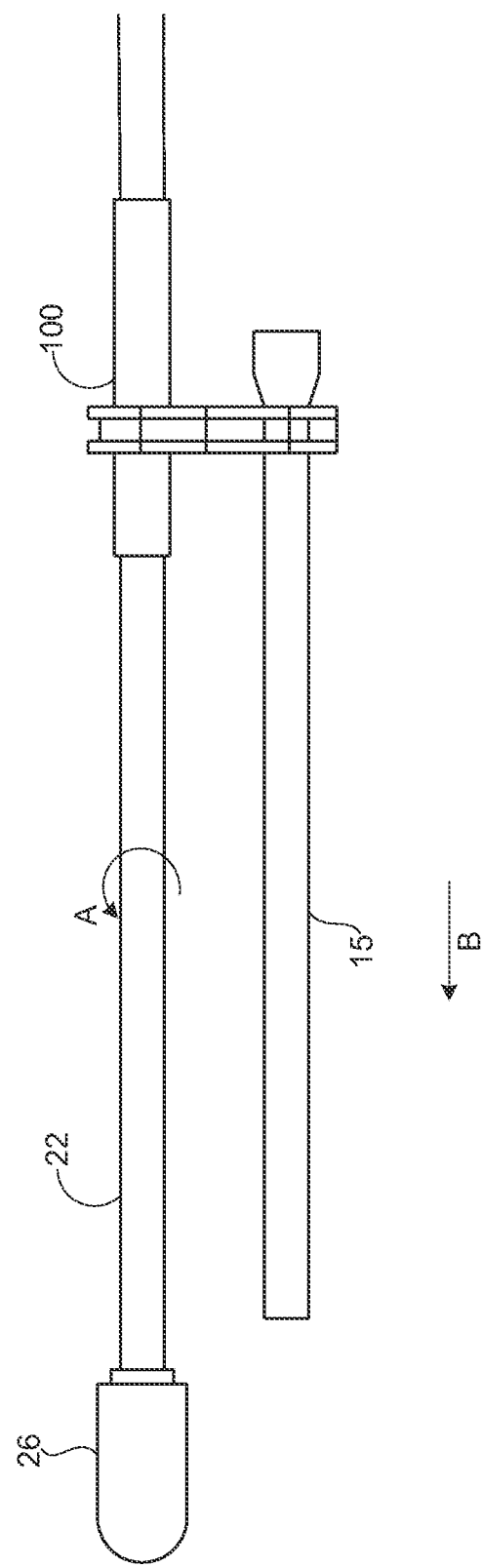
FIG. 2 is a side view a drilling pipe with the pipe hook connected thereon while hooking an unsecured pipe.
Figure 3:
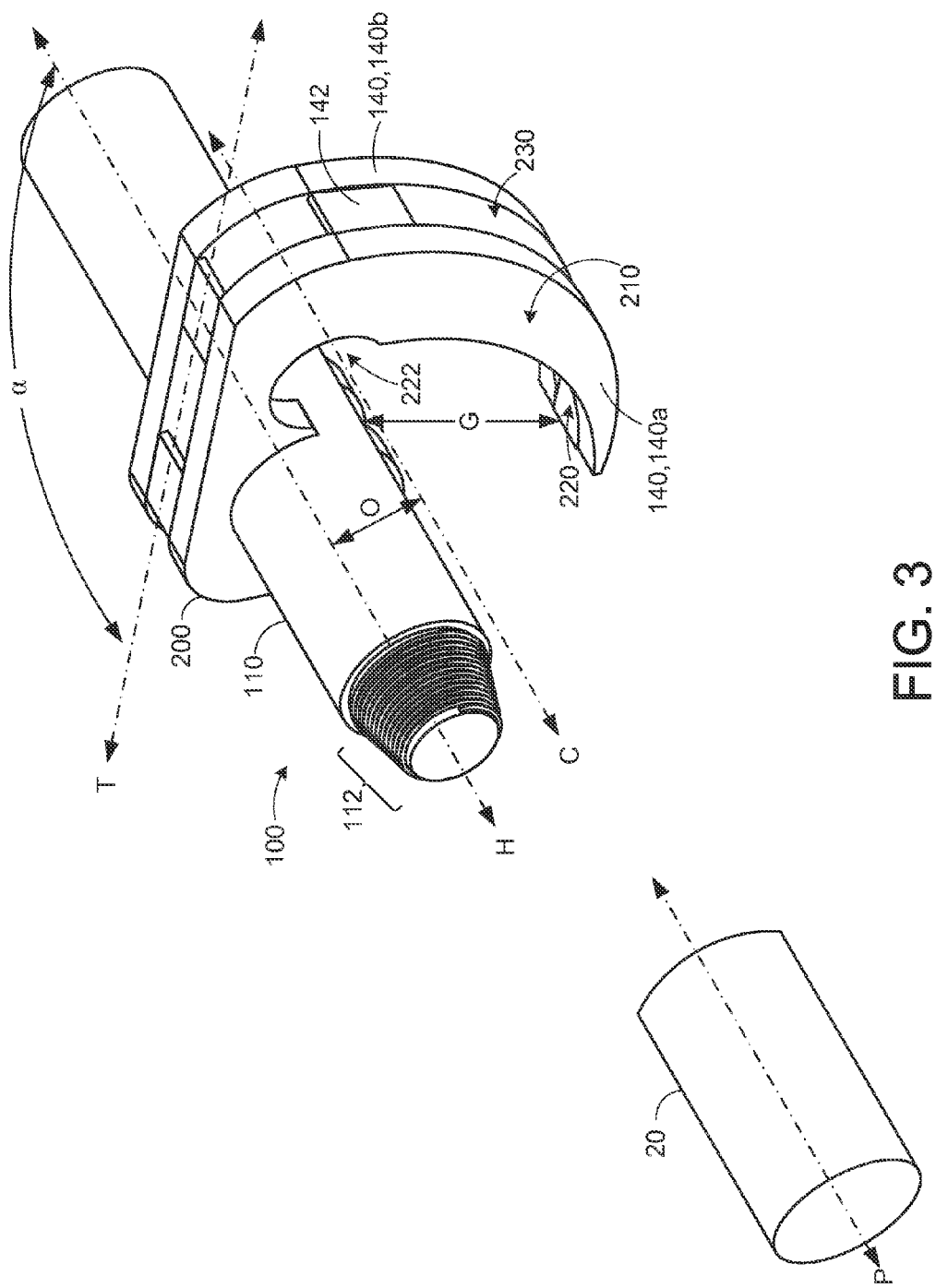
FIG. 3 is a perspective view of an exemplary pipe hook.

Referring to FIGS. 1 and 2, a directional drilling method and apparatus may be used to install a pipeline under a barrier 10, such as highway, road, waterway, building, or other surface obstruction without disturbing the barrier 10. In some implementations, installing a pipeline under a barrier includes placing a drilling or boring apparatus on one side of the barrier 10, and directionally drilling a passageway under the barrier 10. The directional drilling may form a curved or non-linear pilot hole 12 extending from one end 14 of the barrier 10 to the another end 16 of the barrier 10. The passageway 12 is of sufficient size to allow one or more sections of pipe 20 to be pushed or pulled lengthwise through the bore from one side 14 of the barrier 10 to the other side 14.

Directional drilling may include drilling a pilot hole 12 under the barrier as a beginning of the directional drill process. The pilot hole 12 can be achieved by excavation using fluid jetting or a down-hole motor and drill. Depending on the condition of the soil, the pilot bore 12 is formed along a pre-determined alignment in which the path is selected by conventional methods. The typical pilot hole 12 on most large rigs is 9⅞", but can vary depending on the soil conditions and rig size. A drill head 26 attached to the end of a drill pipe 20 drills or cores the pilot hole 12. Drilling fluid is pumped through the drill pipe 20 to a drill head 26 and jetted through or pumped through a drill motor. The drill fluid lubricates the drill stem and carries out cut debris to the surface (e.g., one of the holes 14, 16). The drill fluid is then recycled and re-injected into the drill stem. Forming the pilot hole can take several days, depending on the condition of the soil and may require changing of the drill pipe 20 or drill head 26.

When drillers start the directional drilling process, they consider the path that the drill pipe 20 will follow, specifically the depth and angle that the drill pipe 20 has to take to get to the other side of the barrier 10. The drilling path is usually determined before the start of the drilling process based on the geology of the earth. Once the drilling process is initiated, the drillers constantly take measurements and analyze the depth and the inclination of the bore 12. These measurements are important to verify that the drilled path is consistent with the planned path. In some examples, a down-hole motor is used. The down-hole motor is housed in a drill string 22 directly above the drill bit 26. The down-hole motor allows the drill bit 26 to turn while the drill string 22 stays fixed. A measurement toot may be attached to the down-hole motor to provide the drillers with continuous measurements of depth and inclination of the bore 12.

When rock or other hard materials are encountered in the drilling operation, problems can arise which cause the installation to be difficult and expensive. For example, when installing a large-diameter pipeline, such as a 36" or 40" pipeline under an interstate highway that may be 300 feet wide, massive forces can be present during the directional drilling process. The large forces can result from encountering hard materials along the drill path, making it difficult, if not impossible, to form the bore 12. When rock or other hard materials are encountered the drill pipe 20 may get unscrewed or break, and it becomes difficult to retrieve the unscrewed or broken pipe 15 from the bore 12 especially because the bore 12 is not horizontal and is at an angle. The need for improvements is particularly long-felt in directional drilling for retrieving pipeline sections and pipelines that become unscrewed or break during the drilling process.

Furthermore, the twisting forces created in the drilling operation can be so large that the boring head 26 becomes increasingly likely to completely twist off its drive shaft, also referred to as a drill pipe 20. If the boring head 26 twists off the drill pipe 20, retrieving the boring head 26 can be very time consuming and expensive, and the boring operation may have to be abandoned in favor of a new attempt. Therefore, a long-felt need is felt in directional drilling for retrieving pipeline sections and pipelines that break or become unscrewed during the drilling process without being a time consuming and expensive process. A pipe retriever 100 may be used to retrieve the unsecured pipes 15.

FIG. 1 illustrates drilling a pilot bore 12 under a barrier 10, such as a roadway. A first hole 14 is opened on one side of the barrier 10. A second hole 16 is opened on the opposite side of the barrier 10 along the intended path for a pipeline (not shown). The first and second holes 14 and 16 are dug to the appropriate depth for placement of a pipeline section under the barrier 10. A carrier drilling rig 18 carrying the drill pipe 20 is driven to the drilling location and positioned by a location where the first hole 14 should be dug. A drill string 22 housing a down-hole motor is located directly above the drill bit 26. The down-hole motor allows the drill bit 26 to turn while the drill string 22 stays fixed.

Once the first hole 14 is opened, a directional drilling rig 18 can be used to drill the pilot bore 12. The drilling rig 18 may include a powered rotator (not shown) for rotating a drill pipe 20 carrying a drill bit or drill head 26. The drilling rig 18 may be mounted on or includes an advancer for advancing the drilling operation. For example, the drilling rig 18 can be mounted on tracks that allow the entire drilling rig 18 to move and advance the drilling operation. The drilling rig may be a carrier drilling rig 18 able to drive to different location for drilling.

Drilling the pilot bore 12 can be accomplished by rotating and advancing the drill pipe 20 and the attached drill bit 26. The drill pipe 20 can be any suitable drive shaft for transferring rotational motion from the drilling rig 18 to the drill bit 26. The drilling rig 18 rotates and advances the drill pipe 20 and attached drill bit under the barrier 10 to drill or form the pilot bore 12 from the first hole 14 to create a second hole 16 on the other side of the barrier 10. The pilot bore 12 can be formed by proceeding in either direction from one side of the barrier 10 to the other.

While drilling the pilot bore 12, a drilling fluid, such as water or muddy water, can be supplied through the drill pipe 20 and drill bit 26. Other types of drilling fluid may be used as well, besides water. In some implementations, a drilling fluid pump, in fluid communication with a tank holding the drilling fluid, delivers the drilling fluid to the drill pipe 20. The pump and the tank can be moved on a trailer. In some examples, suitable flexible tubing operatively connects the pump to a rotatable coupling on the drill pipe 20. The drill pipe 20 has an axial passageway for receiving the drilling fluid there through. The pump pumps drilling fluid from the tank, through the flexible tubing, the rotatable coupling, and into the drill pipe 20. The drill pipe 20 may spin within a sliding seal in the coupling while the drilling fluid is pumped into and through drill pipe 20 to the drill bit 26. One or more small ports (not shown) formed at the forward end of the drill pipe 20 or in the drill bit 26 deliver the drilling fluid to the exterior of the drill bit 26. The flowing drilling fluid cools the drill bit 26 and aids in lubricating the cutting of the earth and rock to form the pilot bore 12.

The diameter of the pilot bore 12 can be relatively small compared to the diameter of the pipeline section that is to be installed under the barrier 10. For example, a pilot bore 12 can be 8¾ inches in diameter. The particular size of the pilot bore 12 is not critical, but it is important that the drill bit 26 be sized so that a sufficiently stiff drill pipe 20 can be utilized to cut through any rock, such as a rock strata R, encountered under the barrier 10 while maintaining a straight pilot bore 12. The relatively small diameter of the drill bit 26 results in relatively small twisting threes during the drilling operation, making it relatively easier to form a straight pilot bore 12 beneath the barrier 10.

When connected to the drill pipe 20, the drill bit 26 rotates with the drill pipe 20. The direction of rotation A of the drill bit 26 may be clockwise or counterclockwise. However, when using a threaded pipe connector 24, the direction of rotation should not unscrew the connection. In examples where a down-hole motor is used the drill bit 26 may rotate in a clockwise or counterclockwise direction, while the drill string 22 remains fixed.

The drill pipe 20 and drill bit 26 can be selectively moved or advanced in a forward direction B and/or a reverse direction while drilling the pilot bore 12. While forming the pilot bore 12, the drill bit 26 can be carefully advanced horizontally in the forward direction B to advance from the first hole 14 toward the second proposed hole 16. Upon reaching the second hole 16, the pilot bore 12 is completed, and the drill bit 26 is removed from the drill pipe 20.

Referring to FIGS. 3-6B, in some implementations, a pipe retriever 100 for retrieving an unsecured pipe 15 includes a head 110 and a tail 200. The head 110 is connectable to a drilling pipe 20 and defines a longitudinal axis H. In some examples, the head 110 and the tail 200 are welded to one another; however, other connections are possible as well, such as with fasteners. The longitudinal axis H of the head 110 is substantially parallel to a longitudinal axis P of the drilling pipe 20 when connected to allow the head 110 to securely connect to the pipe 20. In some examples, the longitudinal axis H of the head 110 and the longitudinal axis P of the drilling pipe 20 are not connected in parallel; thus, creating an angle between the longitudinal axis H and the longitudinal axis P. The head 110 may have a cylindrical body. In some examples, the head 110 may be one of the following shapes: an octagon, a hexagon, or a heptagon. Other shapes are possible as well. The head 110 may include a threaded connector 112 connectable to the drilling pipe 20. Other types of connectors to connect the head 110 and the drilling pipe may be used.

The tail 200 extends from the head 110 at an angle α with respect to the longitudinal axis H of the head 110. Therefore, the longitudinal axis T of the tail 200 forms an angle α with respect to the longitudinal axis H of the head 110. In some implementations, the tail 200 extends from the head 110 at an angle α with respect to the longitudinal axis H of the head 110 of between about 45° and about 135° (e.g., about) 90°. An angle α not perpendicular to the body may aid the tail 200 in grabbing the unsecured pipe 15 specifically in situations where the pipe does not have a pipe joint 12.

The tail 200 defines a hook shape 210 having inward 220 and outward surfaces 230. The inward hook surface 220 defines a pipe recess 222 sized for receiving the unsecured pipe 15. The pipe recess 222 may have a circular shape with a radius $R_R$ of between 2 inches and 5 inches (e.g., 2.88 inches). In some examples, the radius $R_R$ equals 3.38 inches. Other radius sizes may be used as well. The recess 222 may define an octagon, a hexagon, a heptagon, or other polygonal shape. Moreover, other shapes and configurations for the pipe recess 222 may be considered. The pipe recess 222 may be sized to allow sliding of the received unsecured pipe 15, and catch a pipe joint 12 of the unsecured pipe 15. The pipe recess 222 may define a circular shape having a radius larger than an outer radius of the unsecured pipe 15 and less than an outer pipe joint 12 radius of the unsecured pipe 15. The difference in radii sizes between the pipe 10 and the pipe joint 12 allows the pipe retriever 100 to securely grab and retrieve the pipe 10.

Figure 4:
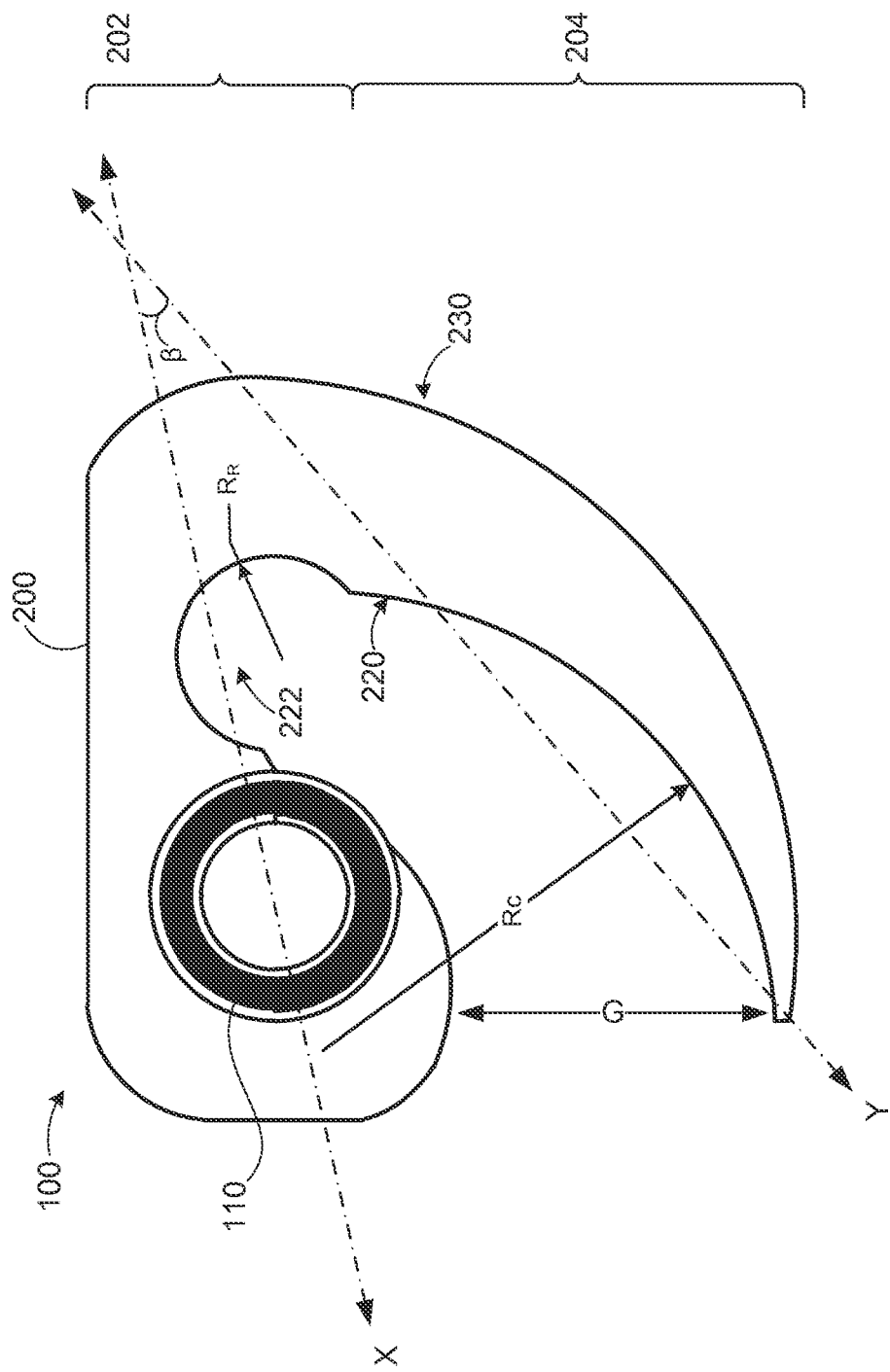
FIG. 4 is a front view of the exemplary pipe hook shown in FIG. 3.
Figure 5:
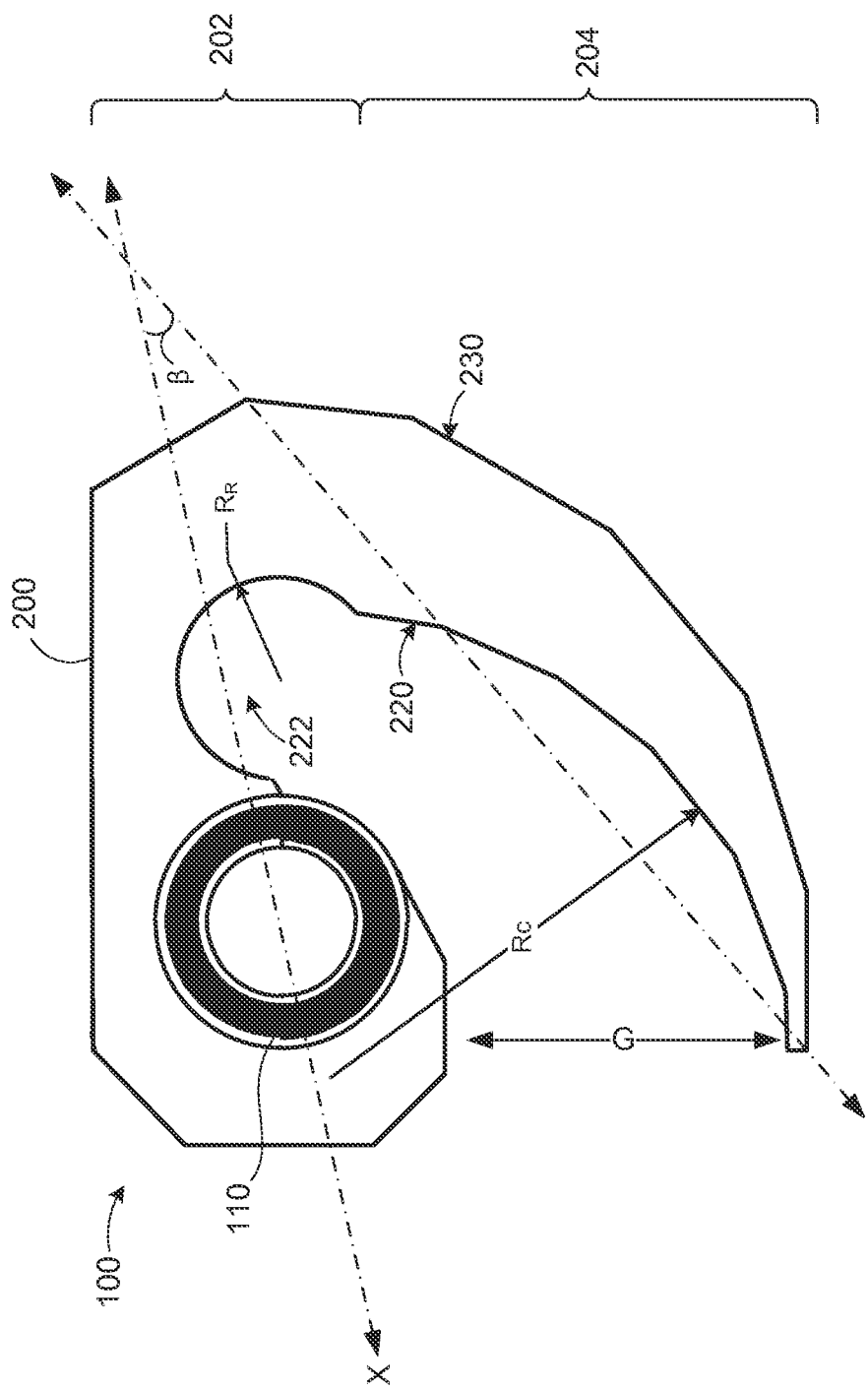
FIG. 5 is a front view of an exemplary pipe hook.

In some implementations, the tail 200 has proximal 202 and distal 204 portions. The proximal tail portion 202 defines the pipe recess 222 and the distal tail portion 204 defines an arcuate shape (FIG. 4). The arcuate shape guides the unsecured pipe 15 to the pipe recess 222. In some examples, the distal tail portion defines an arcuate shape having a combination of straight lines as illustrated in FIG. 5. The shape of the inward hook surface having the straight lines guides the unsecured pipe 15 to the pipe recess 222. The distal tail portion 204 may have a radius of curvature Rc larger than a radius of the pipe recess R. The proximal 202 and distal 204 tail portions may define corresponding longitudinal axes X, Y arranged at an angle β with respect to each other of between about 20° and about 90° (e.g., 30°). The longitudinal axis Y of the distal tail portion 204 may intersect proximal and distal ends of the distal tail portion. A gap G between a distal end of the tail 200 and the head 110 may be greater than a diameter of the unsecured pipe 15 for fitting the unsecured pipe 15 and guiding it to the pipe recess 222.

In some implementations, the tail 200 may include first and second plates 140, 140a, 140b spaced along the longitudinal direction H of the head 110. The first plate 140a and the second plate 140b are coupled to one another with a support 142. More than one support 142 may be used to couple the first and second plates 140a, 140b. The spaced apart support plates 140a, 140b provide a relatively light weight tail 200 resistant to deformation due to moments about the head 110 created by a received unsecured pipe 15. In some examples, the support 142 has a thickness $T_S$ of one inch. Each support 142 may have a different thickness than another support 142. Other support thicknesses may be used. In some examples, each plate 140 has a thickness $T_P$ of two inches, and a separation distance S between the plates 140 is five inches.

In some implementations, the pipe recess 222 defines a center axis C. The center axis C may be arranged substantially parallel to the longitudinal axis H of the receiver head 110. The center axis C of the pipe recess 222 may be offset from the longitudinal axis of the receiver head 110 by a distance O less than or equal to a diameter $D_P$ of the unsecured pipe 15.

Figure 7A:
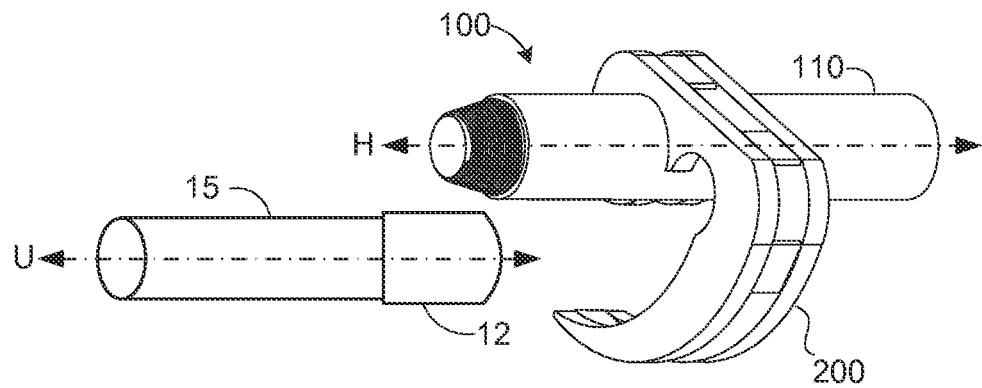
FIGS. 7A-7C are perspective views of an exemplary hook pipe retrieving a pipe.
Figure 7B:
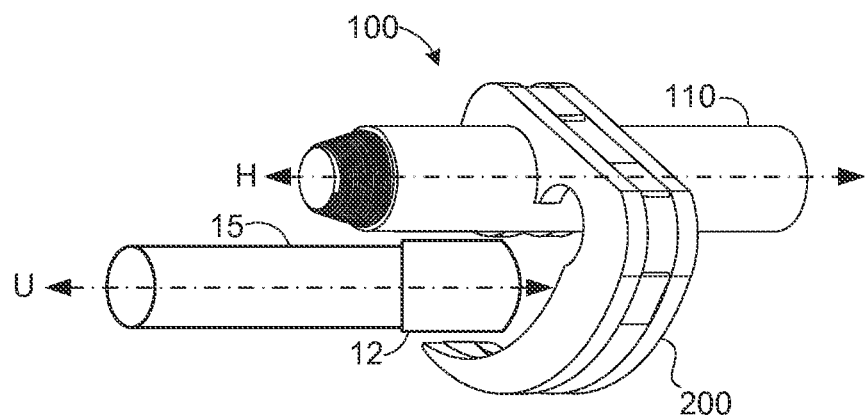
Figure 7C:
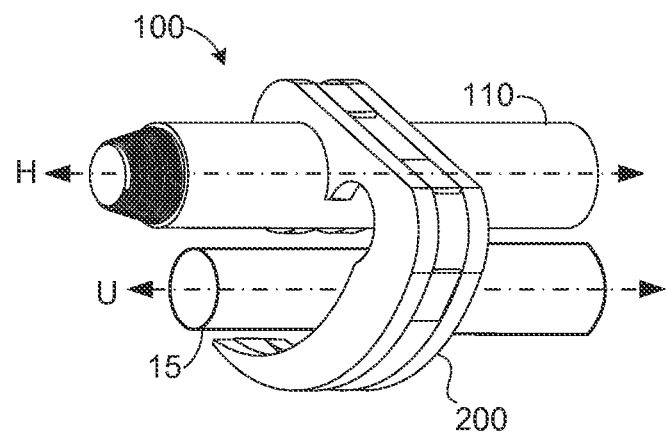

Referring to FIGS. 7A-7C, in some implementations, the pipe retriever 100 approaches an unsecured pipe 15 and grabs the pipe 10. FIG. 4A illustrates the pipe retriever 100 as it approaches the unsecured pipe 15. The unsecured pipe 15 has a longitudinal axis U. In some examples, the longitudinal axis U of the unsecured pipe 15 is not parallel to the longitudinal axis H of the pipe retriever 100. FIG. 4B shows the pipe retriever device 100 as it approaches the joint 12 of the unsecured pipe 15 and begins to rotate to grab the unsecured pipe 15. FIG. 4C shows the pipe retriever 100 as it rotates to hook to the unsecured pipe 15 and retrieve it. When the pipe retriever 100 grabs the unsecured pipe 15, the pipe 15 begins to be pulled out of the bore.

Figure 8A:
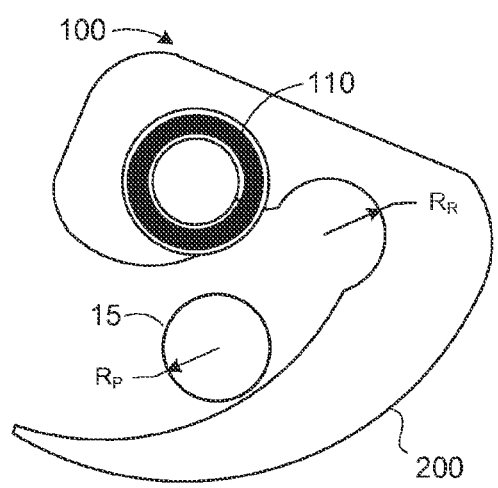
FIGS. 8A-8C are front views of an exemplary hook pipe retrieving a pipe.
Figure 8B:
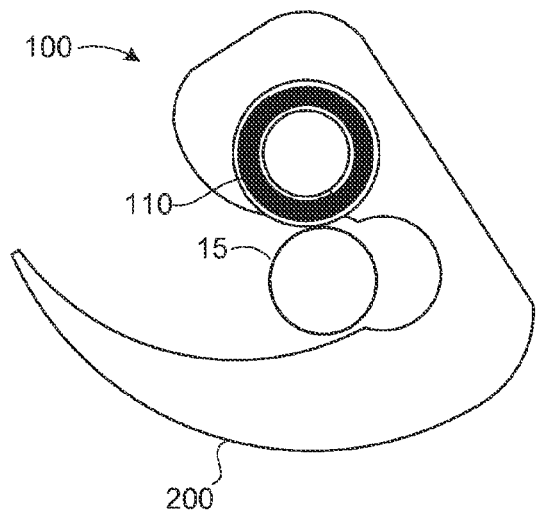
Figure 8C:
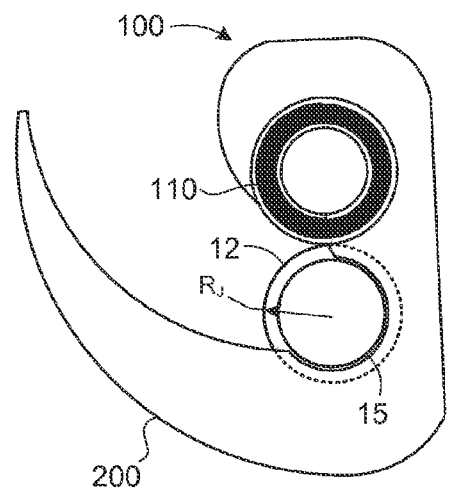
Figure 9:
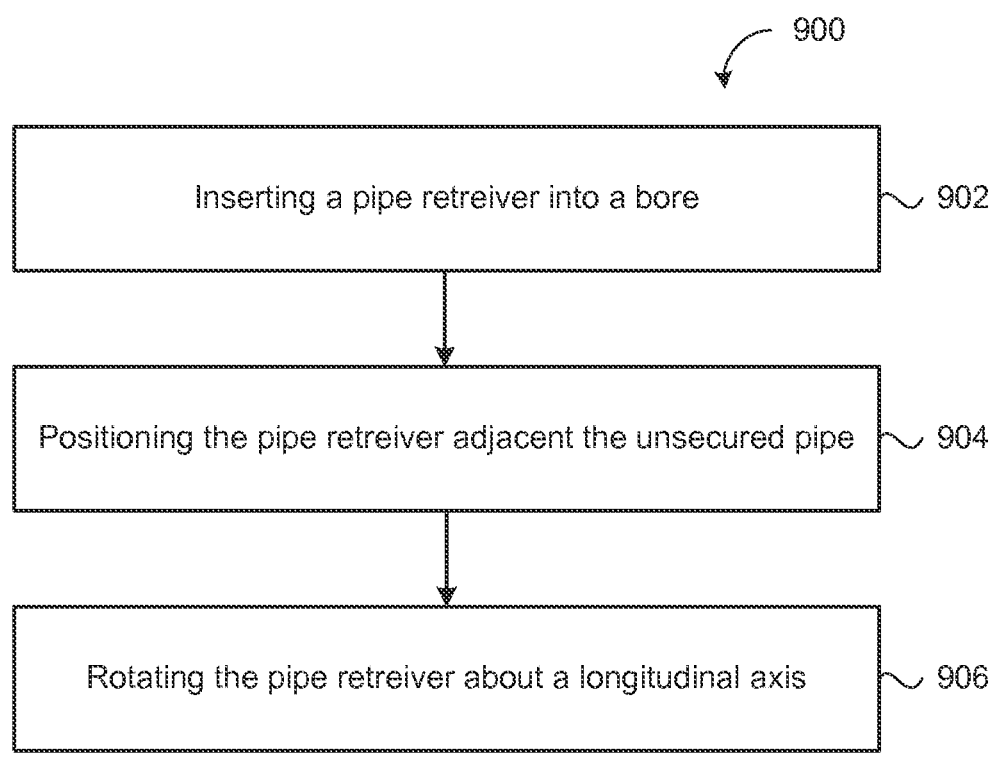
FIG. 9 provides an exemplary arrangement of operations for a method of retrieving an unsecured pipe.

Referring to FIGS. 8A-8C, in some implementations, the pipe retriever 100 rotates to hook the unsecured pipe 15. FIG. 5A shows the pipe retriever device 100 guiding the unsecured pipe 15 to the recess 222. FIG. 5B shows the clockwise rotation of the pipe retriever 100. FIG. 5C shows pipe retriever 100 securing the unsecured pipe 15 in the recess 222 before retrieving the pipe 10.

Figure 6A:
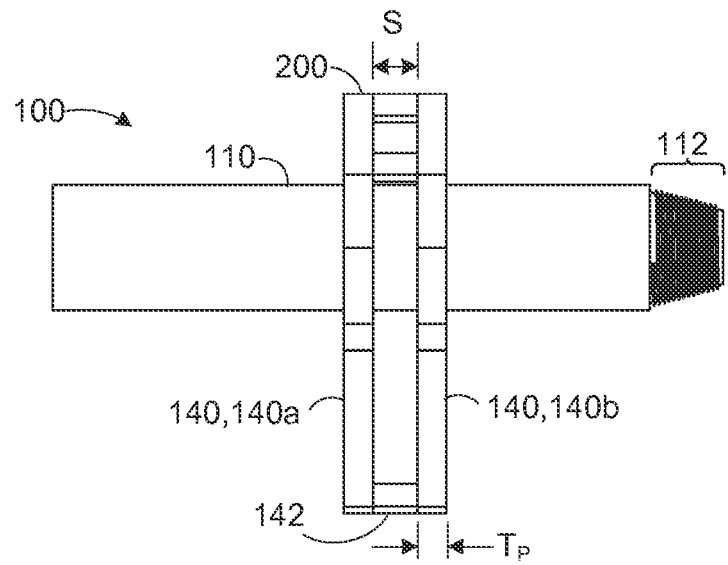
FIGS. 6A and 6B are first and second side views of the pipe hook shown in FIG. 3.
Figure 6B:
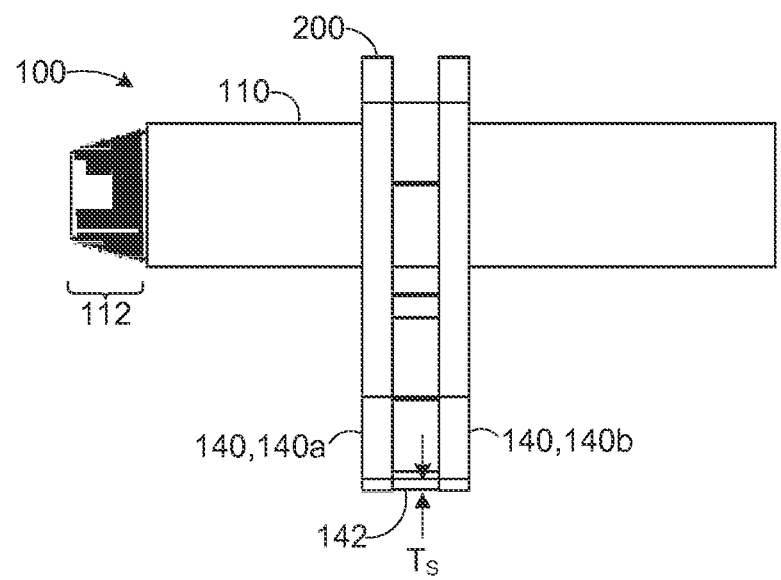

FIG. 6 provides an exemplary arrangement 900 of operations for a method of retrieving an unsecured pipe 15. The method includes inserting 902 a pipe retriever 10 into a bore 12, 13 having an unsecured pipe 15 and positioning 904 the pipe retriever 100 adjacent the unsecured pipe 15. The method also includes rotating 906 the pipe retriever 100 about a longitudinal axis H defined by a head 110 of the pipe retriever 100 to rotate a hook shaped tail 200 extending from the head 110 to receive the unsecured pipe 15. The tail 200 receives the unsecured pipe 15 in a pipe recess 222 defined by the tail 200.

In some implementations, the method includes receiving the unsecured pipe 15 initially along an inward surface 220 of distal tail portion 204. The distal tail portion 204 defines an arcuate shape that guides the unsecured pipe 15 to the pipe recess 222 defined by a proximal portion 202 of the tail 200.

In some implementations the method includes catching a joint 12 of the unsecured pipe 15 in the pipe recess 222. The pipe recess 222 is sized to allow sliding movement of the received unsecured pipe 15 and catch the joint 12 of the unsecured pipe 15. The pipe recess 222 may define a circular shape with a radius $R_R$ larger than an outer radius $R_P$ of the unsecured pipe 15 and less than an outer pipe joint radius $R_J$ of the unsecured pipe 15.

In some implementations, the method includes holding the received unsecured pipe 15 concomitantly juxtaposed (e.g., adjacent and substantially parallel to) a drill pipe 20. The drill pipe 20 is connected to the head 110 of the pipe retriever 100. The pipe recess 222 may define a center axis C arranged substantially parallel to the longitudinal axis H of the head 110. The center axis C of the pipe recess 222 may be offset from the longitudinal axis H of the receiver head 110 by a distance O less than or equal to a diameter $D_P$ of the unsecured pipe 15.

A number of implementations have been described. Nevertheless, it will be understood that various modifications may be made without departing from the spirit and scope of the disclosure. Accordingly, other implementations are within the scope of the following claims.

What is claimed is:

1. A pipe retriever for retrieving an unsecured pipe having a pipe joint, the pipe retriever comprising:
    a head connectable to a drilling pipe and defining a longitudinal axis, the longitudinal axis of the head arranged substantially parallel or coincident to a longitudinal axis of the drilling pipe when connected; and
    a tail extending from the head in a transverse plane at an angle with respect to the longitudinal axis of the head, the tail defining a hook shape and comprising:
        a proximal tail portion defining a pipe recess sized to receive the unsecured pipe, the pipe recess defining a substantially circular shape having a radius larger than an outer radius of the unsecured pipe and less than an outer radius of a pipe joint of the unsecured pipe; and
        a distal tail portion defining a talon shape that has a proximal end disposed on the proximal tail portion and extending away from the proximal tail portion to a free, distal end, the distal tail portion having a receiving surface defining an arcuate shape arranged for guiding the unsecured pipe to the pipe recess;
        wherein the pipe recess has a recess surface extending away incongruently from the receiving surface of the distal tail portion, the receiving surface of the distal tail portion having a radius of curvature larger than the radius of the pipe recess, an intersection of the recess surface and the receiving surface forming a protrusion extending along the longitudinal axis of the head.

2. The pipe retriever of claim 1, wherein the pipe recess is sized to allow sliding of the received unsecured pipe therein and catch the pipe joint of the unsecured pipe.

3. The pipe retriever of claim 1, wherein the proximal tail portion defines a first longitudinal axis and the distal tail portion defines a second longitudinal axis, the first longitudinal axis arranged at an angle with respect to the second longitudinal axis, the angle being between about 20° and about 90°, the first and second longitudinal axis of each tail portion intersecting proximal and distal ends of the respective tail portion.

4. The pipe retriever of claim 3, wherein the angle is about 30°.

5. The pipe retriever of claim 1, wherein a gap between the distal end of the tail and the head is greater than a diameter of the unsecured pipe.

6. The pipe retriever of claim 1, wherein the angle of the tail with respect to the longitudinal axis of the head is between about 45° and about 135°.

7. The pipe retriever of claim 1, wherein the angle of the tail with respect to the longitudinal axis of the head is about 90°.

8. The pipe retriever of claim 1, wherein the pipe recess defines a center axis arranged substantially parallel to the longitudinal axis of the head.

9. The pipe retriever of claim 8, wherein the center axis of the pipe recess is offset from the longitudinal axis of the head by a distance less than or equal to a diameter of the unsecured pipe.

10. The pipe retriever of claim 1, wherein the head comprises a cylindrical body.

11. The pipe retriever of claim 1, wherein the head comprises a threaded connector connectable to the drilling pipe.

12. The pipe retriever of claim 1, wherein the tail comprises first and second plates spaced along the longitudinal axis of the head.

13. A method of retrieving an unsecured pipe having a pipe joint, the method comprising:
    inserting a pipe retriever into a bore having an unsecured pipe;
    positioning the pipe retriever adjacent the unsecured pipe;
    rotating the pipe retriever about a longitudinal axis defined by a head of the pipe retriever to rotate a hook shaped tail extending from the head in a transverse plane at an angle with respect to the longitudinal axis of the head to receive the unsecured pipe, the tail comprising:
        a proximal tail portion defining a pipe recess sized to receive the unsecured pipe, the pipe recess defining a substantially circular shape having a radius larger than an outer radius of the unsecured pipe and less than an outer radius of a pipe joint of the unsecured pipe; and
        a distal tail portion defining a talon shape that has a proximal end disposed on the proximal tail portion and extending away from the proximal tail portion to a free, distal end; and
    receiving the unsecured pipe initially along a receiving surface of the distal tail portion defining an arcuate shape that guides the unsecured pipe to the pipe recess;
    wherein the pipe recess has a recess surface extending away incongruently from the receiving surface of the distal tail portion, the receiving surface of the distal tail portion having a radius of curvature larger than the radius of the pipe recess, an intersection of the recess surface and the receiving surface forming a protrusion extending along the longitudinal axis of the head.

14. The method of claim 13, further comprising catching the joint of the unsecured pipe in the pipe recess, the pipe recess sized to allow sliding movement of the received unsecured pipe and catch the joint of the unsecured pipe.

15. The method of claim 13, further comprising holding the received unsecured pipe adjacent a drill pipe connected to the head of the pipe retriever.

16. The method of claim 15, wherein the pipe recess defines a center axis arranged substantially parallel to the longitudinal axis of the head.

17. The method of claim 16, wherein the center axis of the pipe recess is offset from the longitudinal axis of the head by a distance less than or equal to a diameter of the unsecured pipe.

* * * * *